INVENTORS
GEORGE P. BENTLEY
JOSEPH S. LORD
BY Pennie, Edmonds, Morton, Taylor & Adams
ATTORNEYS INVENTORS
GEORGE P. BENTLEY
JOSEPH S. LORD
BY Pennie, Edmonds, Morton, Taylor & Adams
ATTORNEYS INVENTORS
GEORGE P. BENTLEY
JOSEPH S. LORD
BY Pennie, Edmonds, Morton, Taylor & Adams
ATTORNEYS United States Patent Office 3,446,972

Patented May 27, 1969

3,446,972

AUTOMATIC GAIN CONTROL FOR PHOTOMULTIPLIER TUBES EMPLOYING A MONITORING PHOTOCELL

George P. Bentley, Amherst, and Joseph S. Lord, Walpole, Mass., assignors to Kollmorgen Corporation, Garden City, N.Y., a corporation of New York Filed July 18, 1966, Ser. No. 566,065
Int. Cl. H01j *39/12;* G01d *5/34*
U.S. Cl. 250—207 8 Claims The present invention relates generally to pulsed light photometers and more particularly to improved methods and apparatus adapted to compensate for undesired variations in the light output amplitude of the pulsed light source.

The compensation method and apparatus provided by the present invention is particularly useful with the pulsed light photometers described and illustrated in applicants' pending application Ser. No. 399,153 entitled, "Photometric Method and Apparatus," filed Sept. 25, 1964, and assigned to the same assignee. In using available flash-lamp sources in photometers and colorimeters, such as pulsed xenon arc-lamps, applicants have found that there is an undersired random pulse to pulse amplitude variation of one to two percent which shows up as a noise error signal on the instrument readout. Where a pulsed flash-lamp is used as a source for the preferred type comparison of differential type photometer, the measured differential output signal of which may be defined as $$\frac{e\ \text{sample} - e\ \text{standard}}{e\ \text{standard}}$$

it will be particularly appreciated that the undesired noise signal superposed on the differential output signal produces a high noise-to-signal ratio that seriously limits the closeness of match that can be obtained. At the sacrifice of increased instrument response time, the random error signal can be greatly reduced by the use of integration or high time constant filter circuits in the readout circuit. In many applications, however, a rapid response time is required for high speed measurements and the slower response time imposed by integration or averaging circuits cannot be tolerated.

Accordingly, there has existed a need for a circuit method and apparatus, such as that provided by the present invention, which will greatly reduce the above-described readout error produced by uncertainty of pulse light amplitude without introducing any delay or increase in measurement response time.

In accordance with a preferred embodiment of the present invention, a separate monitoring photosensor is provided to continuously measure the amplitudes of the periodic light pulses generated to alternately illuminate standard and unknown sample materials and produce in response thereto a control signal proportional in amplitude to that of each light pulse. The control signal is utilized in a feed-forward variable gain circuit to instantaneously correct the amplitude of the output signals produced by one or more main photosenors provided to measure the light pulses transmitted by or reflected from the respective standard and unknown sample materials.

In the preferred circuit arrangement utilizing a photomultiplier type main photosensor, the control signal is coupled to one or more of the dynode multiplier elements in the proper polarity to modulate the dynode gain inversely as a function of the control signal amplitude.

In a second preferred circuit arrangement, the monitoring photosensor (one or more) is utilized as a variable load resistance for the main photosensor and correction for undesired variations in the level of flash illumination for both the standard and sample materials is instantaneously provided.

In a further preferred circuit arrangement provided in accordance with the present invention, a pair of slaved amplifiers is provided to separately amplify the alternate "standard" and "sample" output pulses from each main photosensor and circuit means are provided for rapidly changing the gain of each slave amplifier on a switched time-sequence basis prior to measurement. Both the standard and unknown measurement signals as well as the monitoring control signals therefor are transiently stored in boxcar peak detector circuits and the gains of the slave amplifiers are corrected by the respective control signals on a switched basis before the "standard" and "unknown" measurement signals are switched to the slave amplifier inputs.

The compensation method and apparatus provided by the present invention effectively reduces random variations in the output measurements of a pulsed light photometer to a value less than 0.2% throughout the entire visible light spectrum and thus makes it possible to obtain accurate highspeed colorimetric measurements utilizing exposure times as short as 2 microseconds on target areas as small as ⅛ inch diameter.

Various additional objects and advantages of the present invention will be discussed in connection with the following description of the drawings in which.

Figure 1:
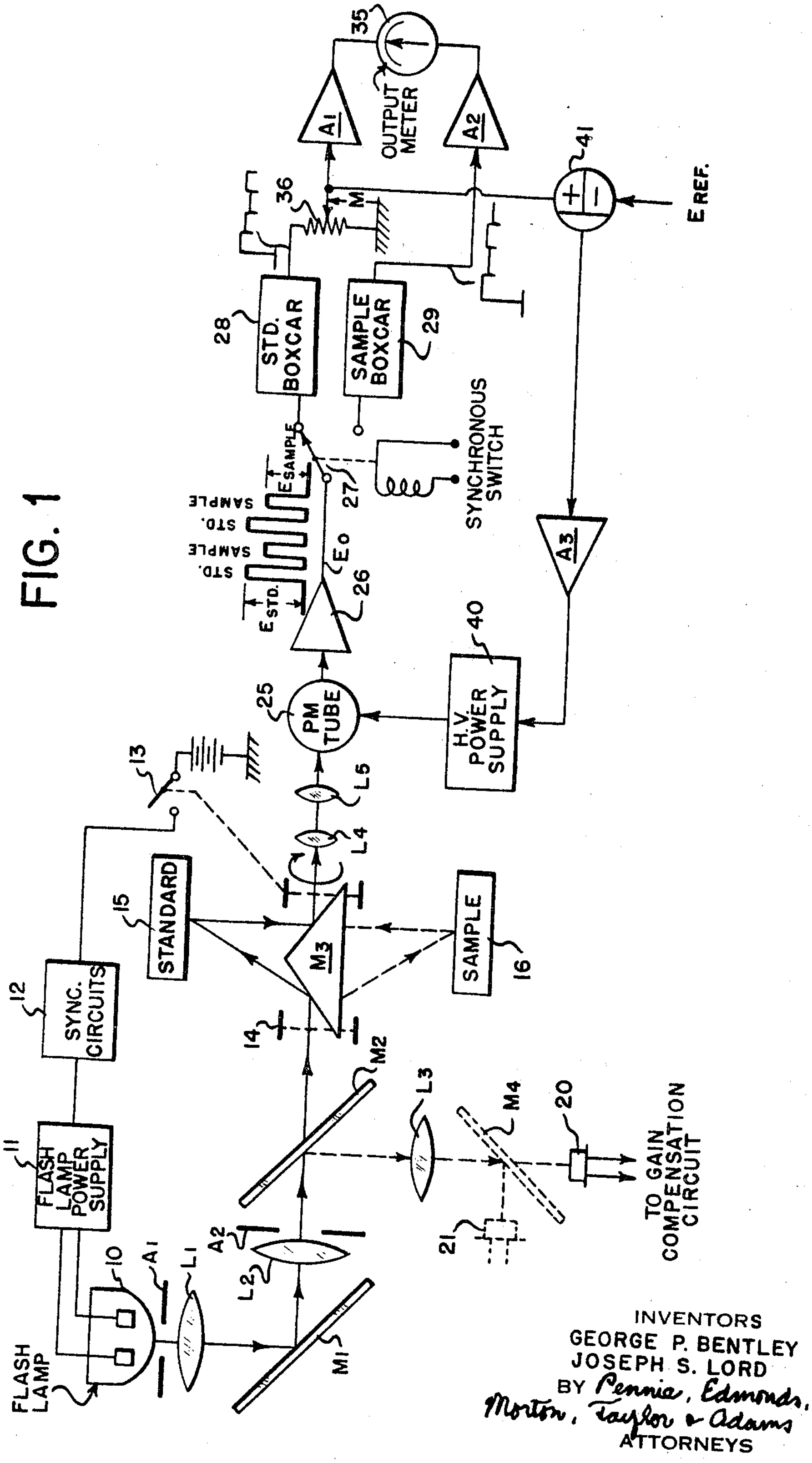
FIG. 1 is a simplified electro-optical schematic diagram of an improved pulsed-light photometer provided by the present invention.

Referring to FIG. 1, there is shown a simplified block diagram of a pulsed-light photometer comprising a pulsed xenon flash lamp 10 that is periodically energized by power supply 11. Power supply 11 is triggered by synchronizing pulses from sync circuit 12 which is triggered by the closure of switch 13. Switch 13 is either cam actuated mechanically or electrically actuated (e.g. by commutator) by the rotation of mirror $M_3$ rotatably supported by housing 14 so that lamp 10 is flashed twice for each rotation of $M_3$, once to illuminate the standard material 15 and once to illuminate the unknown sample 16.

As shown, the optical system comprises lens $L_1$ for collecting light rays from lamp 10, aperture stop $A_1$, first surface mirror $M_1$, second lens $L_2$ and aperture $A_2$. The arc from lamp 10 is imaged on stop $A_2$ where the rays from the unstable parts of the arc near the electrodes are intercepted and absorbed by the stop. Lens $L_2$ is provided to focus the circular aperture $A_1$ on the sample 16 and the standard 15. Mirror $M_2$ is a beam splitter adapted to reflect about 8% of the pulse light energy to lens $L_3$ and in turn to monitoring photosensors 20 and 21 via beam splitter mirror $M_4$.

The remaining pulse light energy is transmitted by $M_2$ to $M_3$ which comprises a pair of first surface mirrors that rotate as a unit so that alternate flashes from lamp 10 are caused to illuminate the standard 15 and sample 16. Light pulses reflected from either the sample or the standard are reflected from the right hand surface of $M_3$ through lenses $L_4$ and $L_5$ to the main photosensor 25 which is preferably a photomultiplier tube. Pulse output signals from photosensor 25 corresponding in amplitude to the light pulses reflected from 15 and 16 are amplified by amplifier 26 and selectively gated by synchronous switch 27 so that alternate "standard" pulse signals are switched to the input of the "standard" boxcar detector 28 and alternate "sample" pulse signals are selectively switched to the "sample" boxcar detector 29. Switch 27 is operated in synchronism with the rotating optical system and flash trigger circuits so that only the sample pulses are supplied to the input of the "sample" boxcar detector 28 and only the "standard" boxcar detector 29. The boxcar detectors function as peak reading detectors which provide output signals corresponding in amplitude to the peak values of the short duration input pulses, the output signal levels being held substantially constant during the intervals between pulse inputs. Thus the boxcar circuits convert the relatively short duration input pulses (i.e. $<50$ $\mu$sec.) into pulses that are as wide as the reciprocal of the repetition rate (e.g. 30 to 60 p.p.s.). Since such circuits are well known in the art, further description of their operation will not be given herein.

The respective output signals from 28 and 29 are coupled to output meter 35 through amplifiers $A_1$ and $A_2$ as shown and the output meter reading is nulled by adjusting potentiometer 36 so that $M \times E_{standard} = E_{sample}$, where M equals the reflectance (or transmittance as required) value of the sample compared to the standard.

In the preferred embodiment, long-term stabilization of flash intensity is effected by a D-C negative feedback loop to the dynode multiplier of the photomultiplier tube 25. The loop comprises the D-C high-voltage supply 40 which is regulated by the amplified output error signal from comparator 41 representing the difference between reference voltage $E_{Ref}$ and the output signal from 28 as shown.

It is understood that the optical arrangement shown in FIG. 1 is merely exemplary and that other means may be utilized to either simultaneously illuminate but alternately view sample and standard on alternate pulse flashes or alternately view sample and standard on alternate light pulses and the like. All of these modes of operation are considered to be within the contemplated meaning of alternately illuminating the standard and unknown sample as used in the specification and claims.

Figures 2, 2A:
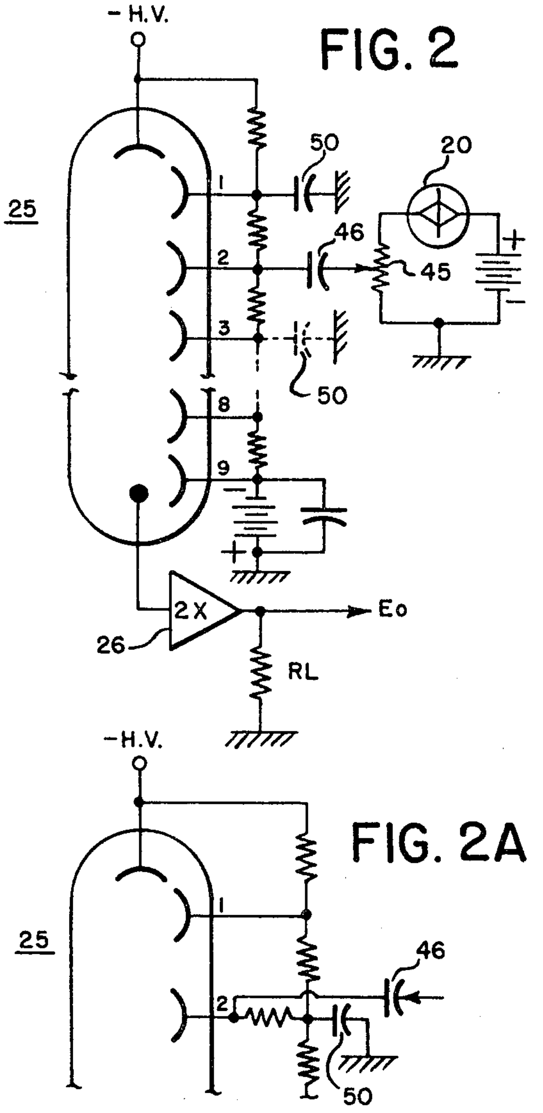
FIGS. 2 and 2A are schematic diagrams of pulse-light compensation circuits utilizing inverse gain modulation of a photomultiplier dynode section.

A preferred gain modulation circuit utilizing a photomultiplier tube as a main photosensor is shown in FIG. 2. A double junction silicon photodiode is utilized as the monitoring photosensor 20 and signal pulses proportional in amplitude to the light flashes generated for illumination of the standard and sample materials developed across potentiometer 45 are coupled to dynode number 2 of the photomultiplier via blocking capacitor 46 and the potentiometer arm as shown. The arm of potentiometer 45 is adjusted to provide maximum reduction of variation in the output amplitude of signal pulses produced across $R_L$ with the optical system fixed for repetitive viewing of only the "standard" material.

Since the gain characteristic of a single dynode on a photomultiplier tube is substantially linear, the application of a control voltage which varies inversely in amplitude as a function of the light flash intensity effectively reduces undesired random variations in the output. Using light intensities which would produce an output pulse of 20 volts across $R_L$, with a minus high voltage of 400 volts on the cathode of the PM tube, a voltage pulse of 10 to 15 volts on dynode number 2 produced a reduction of greater than five to one in the random variation of the output signal across $R_L$.

Where desired, one or more other dynodes, preferably those numbered 2 through 8, can be utilized for inverse gain control by the control pulse produced across potentiometer 45. Appropriate by-pass capacitors 50 are conveniently connected between the desired resistors of the dynode resistance divider and ground to isolate those dynodes which are not to be modulated by the monitor control pulses (see FIGS. 2 and 2A).

Since the inventors have found that the output relative spectral response of a pulsed flash lamp such as the xenon arc lamp is substantially constant with small changes in light output amplitude, it will be appreciated by those skilled in the art that the monitoring control pulses produced by a single monitoring photosensor 20 may be utilized to gain modulate addition photomultiplier tubes as required. For example, with a colorimeter using separate photosensors for each primary color, the control pulses from a single monitoring photosensor may be used to simultaneously control all three sensors.

Figure 3:
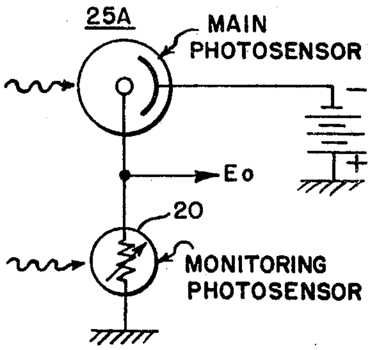
FIGS. 3 and 3A are schematic diagrams of pulse-light compensation circuits utilizing the monitoring photosensors as variable resistance load circuits for the main photosensor.
Figure 3A:
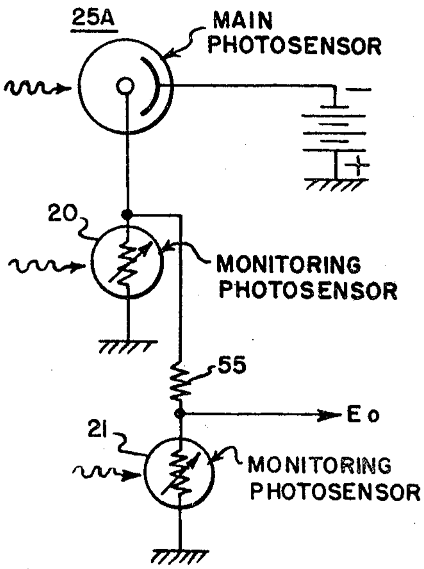

A second gain modulation control means provided in accordance with the present invention is illustrated in FIGS. 3 and 3A. In this embodiment, the monitoring photosensor 20 is connected directly into the load circuit of the main photosensor 25A to effect the desired compensation. The main photosensor 25A may comprise a phototube or a photomultiplier tube and the monitoring photosensors 20 and 21 are chosen to have a resistance which varies substantially inversely as a function of the incident pulse light to which they are exposed. In this regard cadmium sulfide and cadmium sulfoselenide type photoconductive cells have been found to perform satisfactorily. Operation of the compensation may be explained as follows. The output current $I_o$ of a high vacuum type phototube varies directly in proportion to the light flux $F_1$ (lumens) impinging on the cathode. Thus $I_o = SF_1$ where S equals the cathode sensitivity in amperses/lumen. Over a large part of their respective operating ranges, both the vacuum phototube and the photomultiplier can be considered constant-current generators. Accordingly, if the output load resistor $R_L$ for the main photosensor is varied inversely in value with the quantity of incident light flux $F_L$, the load resistance may be defined as $R_L = K/F_2$ where K equals a constant of proportionality. The output voltage $E_o$ may then be defined as $E_o = I_o R_L = SK\ F_1/F_2$. Thus it can be seen that the output voltage is proportional to the ratio of $F_1$ to $F_2$. If the value of $F_1$ varies in response to a change in reflectance of transmittance of the standard or sample, the output voltage $E_o$ will change proportionally. However, if $F_1$ and $F_2$ both vary as a result of a change in the flash lamp output, $E_o$ will not change in value since the ratio of $F_1$ to $F_2$ remains constant by virtue of the optical system used.

With the use of a single monitoring photosensor as shown in FIG. 3, a reduction in random output variations in the order of 4:1 can be readily obtained. By using two monitoring photosensors 20 and 21 connected as shown in FIG. 3A, random output variations can be reduced by 8:1. The additional improvement is attributed to the fact the two cell embodiment more nearly satisfies the requirement that the load resistance $R_L = K/F_2$. With optimum operating conditions, the measured resistance of sensors 20 and 21 under pulse illumination was found to be in the range of 3000 to 6000 ohms. Resistor 55, having a value of 9000 ohms, was connected in series with 21 as shown.

It should be noted that the load resistance characteristic required to produce optimum compensation should have a straight line log-log plot of resistance versus illumination with a slope of negative one $(-1)$. Type CL-705HL photosensors manufactured by Clairex Corporation, New York, N.Y., having a characteristic slope less than $-1$ were found to function satisfactorily in the circuit of FIG. 3A.

Figure 4:
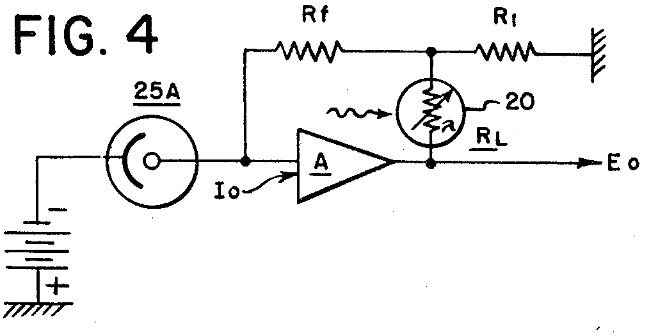
FIG. 4 is a simplified diagram of a variable gain negative-feedback amplifier in which the feedback factor is controlled by the monitoring photosensor to effect pulse-light amplitude compensation.

In accordance with a further preferred embodiment of the present invention, compensation is effected by directly modulating the feedback factor B in a negative feedback amplifier as shown in the simplified circuit of FIG. 4.

Monitoring photosensor 20 is connected as a variable feedback resistor to the juncture of resistor $R_f$ and resistor $R_1$. With an input current $I_o$ from the main photosensor 25A, the output voltage may be defined as $$E_o=I_oR_f\times\frac{R_1+R_L}{R_1}$$

If $R_1<<R_L$, then $$E_o=I_oR_f\frac{R_L}{R_1}$$

But $R_L$ is defined by the resistance of the monitoring photosensor ($R_L=K/F_2$) and the input current $I_o=SF_1$. Thus, the output voltage may be defined as $$E_o=\frac{SKR_f}{R_1}\cdot\frac{F_1}{F_2}$$

It will be recognized that the latter equation is of the same form as that given above in connection with the description of FIGS. 2–3, and it will be appreciated by those skilled in the art that additional monitoring photosensors may be incorporated either as shunt or series elements in the fedback control to provide a more accurate inverse gain modulation characteristic.

Figure 5:
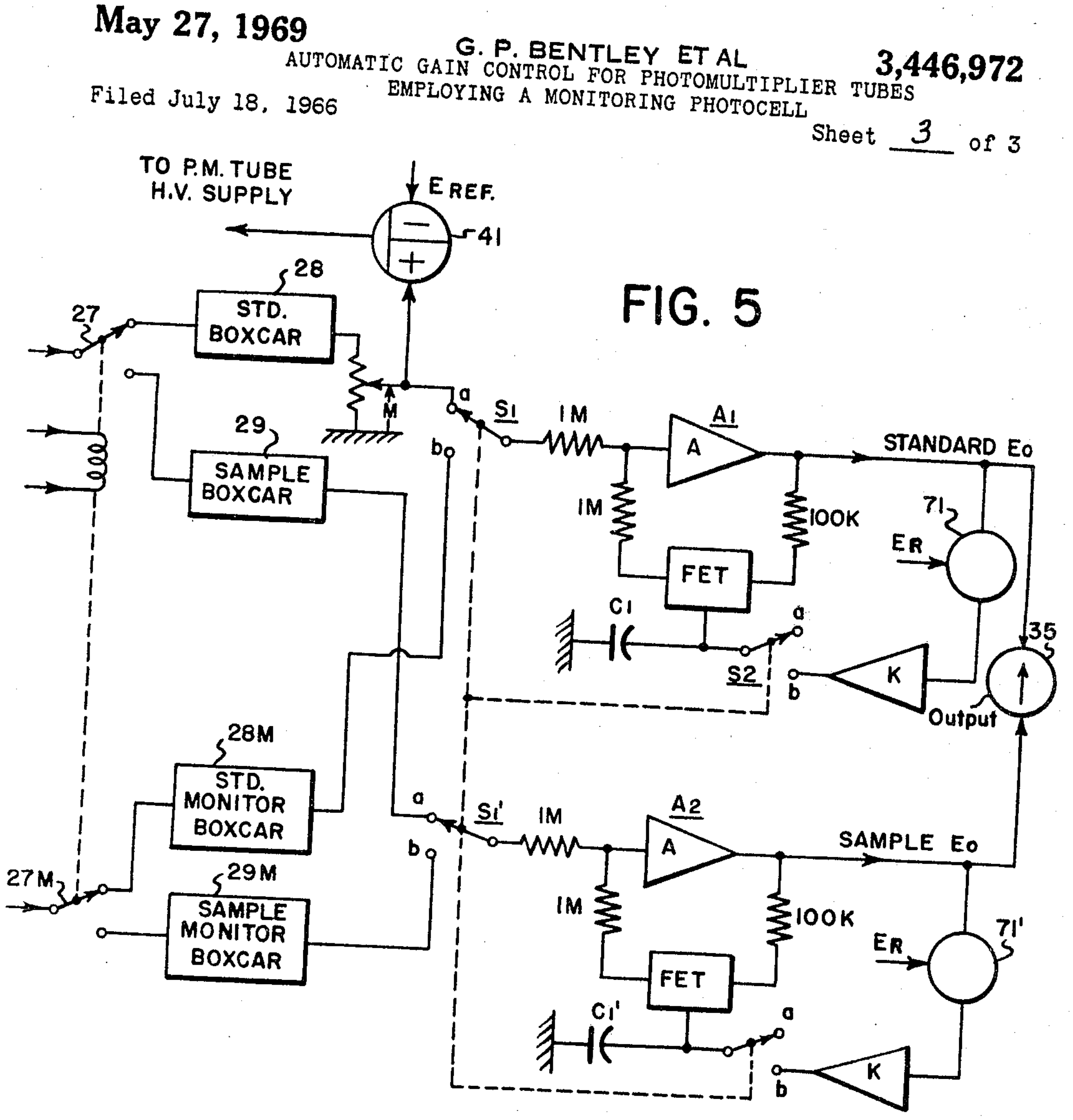
FIG. 5 is a simplied diagram of a switched time-sequential gain compensation circuit provided by the invention.
Figure 6:
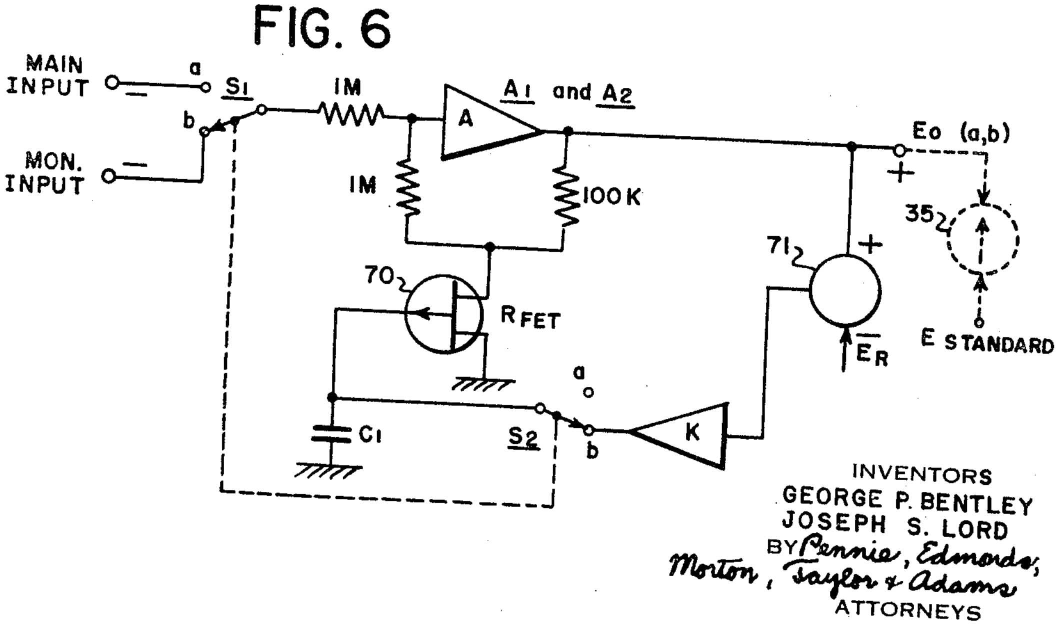
FIG. 6 is a simplified diagram of a time sequence controlled variable gain slave amplifier for use with the circuit of FIG. 5.

Referring to FIGS. 5 and 6, there is shown a further gain compensation circuit provided by the present invention wherein the gains of the main photosensor amplifiers $A_1$ and $A_2$ are controlled on a switched time sequence basis by control signals from monitor photosensor 20. A prefered slaved amplifier for $A_1$ and $A_2$ of FIG. 5 is shown in FIG. 6. The feedback amplifier A is adapted to receive either an input (a) from the main photosensor or in input (b) from the monitor photosensor on a time switched basis through switch $S_1$ which is operated synchronously with switch $S_2$ as indicated. The gain of feedback amplifier A is varied by changing the conductivity or resistance ($R_{FET}$) of the field-effect-transistor 70 which varies the feedback factor B of the amplifier. The gain of the amplifier is constant as long as $S_2$ is in the *a* position since the charge on $C_1$ holds the conductance of 70 constant. When switch $S_2$ is switched to the *b* position and the charge on $C_1$ is changed in accordance with the amplitude of the monitor control signal from 20, the conductivity of 70 is changed and the gain of A is changed accordingly. The field-effect-transistor has the desired characteristic such that at low source to drain voltages, its resistance is substantialy linear and the feedback factor B is readily changed by changing the conductivity of transistor 70 to ground. Thus, if A' is the gain of the slaved amplifier for a given input voltage $E_1$, the output voltage may be defined as $E_{oa}=A'E_1$ when the switches $S_1$ and $S_2$ are in the *a* position. The gain of the feedback amplifier may be defined as $A'=1/B$ where $$B=\frac{R_{FET}}{100K+R_{FET}}$$

for the circuit shown in FIG. 6. When $S_1$ and $S_2$ are in the *b* position, the amplified D-C monitor control signal is compared to a desired D-C reference $E_R$ at summing junction 71, and the difference amplified by amplifier K is applied to capacitor $C_1$ to correct the gain of amplifier $A_1$ (or $A_2$) as required. The feedback factor B is thus varied so that $E_{ob}$ is forced to equal $E_R$. The amplifier gain may thus be defined as $$A'=\frac{E_{ob}}{E_L}=\frac{E_R}{E_L}=\frac{C}{E_L}$$

where $E_L$ is the monitoring control voltage and C is a constant. From the foregoing it can be seen that the gain A' of the slaved amplifier is changed inversely as a function of $E_L$ the monitor control voltage which varies in amplitude with flash tube intensity.

In operation the switches $S_1$ and $S_2$, which are preferably of the solid-state type, are actuated synchronously with the time of closure on the *b* input being much less than that on the *a* input. Immediately after each flash occurs, the amplifier input is briefly switched to the monitor control *b* input for a short period of time (e.g. 40–50 microseconds) to set amplifier gain and then switched to the *a* input (main photosensor) for the remaining time period (e.g. 33 milliseconds) until the next flash occurs.

The output compensation circuits for a comparison type photometer (as shown in FIG. 1) utilizing a pair of the gain controlled amplifiers illustrated in FIG. 6 is shown in FIG. 5, like elements being numbered the same. Two additional boxcar detectors 28M and 29M are provided to convert the monitor control pulses from photosensor 20 to variable amplitude D-C control voltages that are supplied to the *b* inputs of switches $S_1$ and $S'_1$ as shown. The required gating of the alternate "sample" and standard" pulses from 20 is effected by switch 27M operated synchronously with switch 27.

Switches $S_1$–$S'_1$ and $S_2$–$S'_2$, preferably solid state, may be switched from the normally closed *a* position to the gainset *b* position by sync pulses from 12 having a time duration of 40–50 microseconds.

The operation of amplifiers $A_1$ and $A_2$ is the same as described for FIG. 6, the respective outputs being differentially compared by calibrated meter indicator 35 to provide a measurement of sample reflectance (or transmittance) relative to a known standard.

Whereas the comparison type measurement provided by the circuit shown in FIG. 5 is generally preferred from the standpoint of accuracy, for portable applications where weight and battery power consumption are important factors for consideration, measurement of an unknown sample may be made by exposing it to a single pulse flash and the compensated output signal $E_o$ of a single amplifier as shown in FIG. 6 may be compared directly to a standard D-C reference voltage by meter 35 as indicated in dotted outline.

While preferred embodiments of the present invention have been described and illustrated in the drawings, it will be appreciated by those skilled in the art that various modifications may be made therein without departing from the scope of the invention as defined in the claims.

What is claimed is:

1. In a photometer having a pulsed light source for alternately illuminating standard and unknown sample materials and at least one main photosensor for detecting the pulses of light directed thereto from said standard and unknown sample materials, means for reducing the photometer output noise error resulting from variations in output amplitude of the light pulses produced by said source, said means comprising:

pulse light monitoring means for producing a control signal proportional in amplitude to the light output from said light source, said means including a monitoring photosensor with optical means for imaging a portion of the light produced by said pulsed light source on said monitoring photosensor, and gain modulation means responsive to said control signal for varying the amplitude of the output signal from said main photosensor inversely as a function of the amplitude of said control signal.

2. Apparatus in accordance with claim 1 characterized in that said main photosensor comprises a photo-multiplier of dynode multiplier elements and said gain modulation means includes circuit means for coupling the control signal to at least one of the dynode elements in a polarity such as to vary the gain of the dynode multiplier inversely as a function of the amplitude of said control signal.

3. In a photometer having a pulsed light source for alternately illuminating standard and unknown sample materials and at least one main photosensor for detecting the pulses of light directed thereto from said standard and unknown sample materials, means for reducing the photosensor output noise error resulting from variations in output amplitude of the light pulses produced by said source, said means comprising:

a monitoring photosensor having a resistance which varies inversely as a function of incident light, optical means for imaging a portion of the light produced by said pulsed light source on said monitoring photosensor, and means for connecting the monitoring photosensor into the output load circuit for said main photosensor.

4. Apparatus in accordance with claim 1 characterized in that said gain modulation means comprises a negative feedback amplifier for amplifying the output pulse signals from said main photosensor including circuit means responsive to said control signal for varying the feedback factor of the amplifier in proportion to the amplitude of said control signal.

5. In a photometer having a pulsed light source for alternately illuminating standard and unknown sample materials and at least one main photosensor for detecting the pulses of light directed thereto from said standard and unknown sample materials, means for reducing the photosensor output noise error resulting from variations in output amplitude of the light pulses produced by said source, said means comprising:

pulse light monitoring means for producing a first control signal proportional in amplitude to the light pulses illuminating said standard and a second control signal proportional in amplitude to the light pulses illuminating said sample, first amplifier means for amplifying the pulse signals produced by said main photosensor in response to exposure to light pulses from said standard, second amplifier means for amplifying the pulse signals produced by said main photosensor in response to exposure to light pulses from said sample, first circuit means for modulating the gain of said first amplifier inversely as a function of the amplitude of said first control signal, second circuit means for modulating the gain of said second amplifier inversely as a function of the amplitude of said second control signal, and indicator means for differentially comparing the output signals from said first and second amplifiers.

6. Photometric apparatus comprising:

a pulsed light source for illuminating an unknown sample material and at least one main photosensor for detecting the pulse of light directed thereto from said sample, means for reducing the output noise error resulting from a departure in the output amplitude of the light pulse produced by said source with respect to a predetermined reference value, said means including a monitoring photosensor for producing a control signal proportional in amplitude to the light pulse illuminating said sample, circuit means for comparing the amplitude of said control signal with said reference value to produce a differential gain control signal, and gain modulation means responsive to said differential gain control signal for varying the amplitude of the output signal from said main photosensor inversely as a function of the amplitude of said differential gain control signal.

7. In a photometer having a pulsed light source for alternately illuminating standard and unknown sample materials and at least one main photosensor for detecting the pulses of light directed thereto from said standard and unknown sample materials, the method of reducing the photometer output noise error produced by undesired variations in output amplitude of the light pulses generated by said pulsed light source, said method comprising the steps of:

producing a control signal proportional in amplitude to the light output from said pulse light source, and varying the amplitude of the output signal from said main photosensor inversely as a function of the amplitude of said control signal.

8. Apparatus in acocrdance with claim 1 characterized in that said gain modulation means comprises a negative feedback amplifier for amplifying the output pulse signals from said main photosensor including circuit means responsive to the resistance change of at least one monitoring photosensor for varying the feedback factor of the amplifier in proportion to the amplitude of the pulsed light output.

References Cited

UNITED STATES PATENTS

| | | | |
|---|---|---|---|
| 2,722,156 | 11/1955 | Warren | 88—23 |
| 2,745,311 | 5/1956 | Touvet | 88—23 X |
| 2,874,606 | 2/1959 | Leiterer | 88—23 X |
| 2,995,978 | 8/1961 | Glandon et al. | 250—207 X |
| 3,183,353 | 5/1965 | Baldwin | 250—207 X |
| 3,354,773 | 11/1967 | Shreve | 250—207 X |
| 3,387,140 | 6/1968 | Roth et al. | 250—220 X |

JAMES W. LAWRENCE, *Primary Examiner.*

C. R. CAMPBELL, *Assistant Examiner.*

U.S. Cl. X.R.

250—208, 209, 220; 356—229